United States Patent Office 3,024,254
Patented Mar. 6, 1962

3,024,254
VAT-STABLE VAT DYE AND PROCESS OF MAKING THE SAME
William Dettwyler, Hockessin, Del., assignor to E. I. du Pont de Nemours and Company, Wilmington, Del., a corporation of Delaware
No Drawing. Filed July 28, 1958, Ser. No. 751,195
3 Claims. (Cl. 260—362)

This invention relates to novel vat dyes and a process for preparing the same. It is an object of this invention to produce an orange vat dye characterized particularly by stability of the color against decomposition in a hot alkaline vat solution (up to 190° F.; customarily referred to as vat stability) and by the stability of its dyeings on cotton against change of shade in the soaping step which is generally employed in the conventional vat dyeing process. (This quality will for brevity be referred to hereinafter as shade-stability to soaping.) Other objects and achievements of this invention will appear as the description proceeds.

My solution to the above problem is based on the discovery that ordinary dibromo-dibenzo(a,h)pyrene-7,14-dione, often referred to as dibromo-dibenzopyrene-quinone and which may be produced by brominating dibenzo(a,h)pyrene-7,14-dione in oleum or in a melt of aluminum chloride and sodium chloride, actually consists of a mixture of two isomeric components. Furthermore, I have discovered a method of separating these components by their differential solubility in concentrated sulfuric acid, and have observed further that the less soluble component, when isolated according to the process detailed hereinbelow is an orange vat dye, redder in shade than the aforesaid mixture (which is now the commercial product), and possesses the surprising and practically valuable properties of brightness, vat stability and shade stability to soaping. The second and more soluble component is yellower than the commercial product, and like it does not possess satisfactory vat stability and shade stability to soaping. Both components, however, possess the ordinary good light fastness and good application properties which are characteristic of the hitherto known commercial product.

My novel method of separation of the two components, according to this invention, comprises, as at least one step thereof, the formation of a slurry of the dihalogenated product in sulfuric acid of 93 to 97% concentration, and stirring this slurry at room temperature (20° to 30° C.), until the following effects are achieved:

The yellow component goes into solution, while the insoluble component is transformed into an orange-colored mass of relatively coarse, crystalline structure. The reaching of this end point may be judged by the following tests:

Microscopic observation of a sample of the precipitate spread thin over a slide will show a uniform field of large, orange-colored crystals against a red-violet background, the latter representing the solution of the yellow component in sulfuric acid. If the acid is too dilute, relatively fine, yellow, needle-like crystals of the second component will be seen among the large orange-colored crystals.

The orange-colored mass is then separated from the acid by filtering, and may be subjected to the customary finishing operations, such as acid-pasting, vatting, or milling with a dispersing agent.

The product thus obtained constitutes the valuable component sought in this invention. It is a vat dye of a bright orange color and produces dyeings fast to light, like commercial dibromo-dibenzopyrenequinone. But it has the additional and most valuable characteristics of being stable in the alkaline vat (at temperatures up to 190° F.) and of producing brighter dyeings on cotton, which undergo but negligible change in shade on being soaped.

The above-mentioned second component may be recovered simply by drowning the sulfuric acid mother liquor in water, recovering the precipitated dye. This second component is yellower in shade than the initial, composite material, and distinguishes further from the first component in not possessing the mentioned valuable qualities of vat stability and shade stability to soaping.

The initial material is generally produced in commerce by two methods. One method involves dissolution of dibenzo(a,h)pyrene-7,14-dione in oleum and treatment with bromine, using iodine as catalyst. The other method is to synthesize dibenzo(a,h)pyrene-7,14-dione by ring-closure of 1,5-dibenzoyl naphthalene in a melt of aluminum chloride and sodium chloride, and then treating the melt with bromine, following which the reaction mass is drowned in dilute hydrochloric acid. The product obtained by the second procedure generally contains some chlorine. Consequently, it is more accurate to refer to the product as a halogenated product lrather than a brominated one, even though the predominant portion of its halogen content is bromine.

As for the product of the first method, I have discovered to my amazement, by the separation methods of this invention, that the distribution of the two principal components therein will vary, depending on the quantity of catalyst employed in the bromination. Very low quantities of iodine seem to favor formation of the less desirable sulfuric acid-soluble, yellower component.

In the practice of my invention, one may start with the isolated dry halogenated product produced according to one or the other of the above mentioned methods.

On the other hand, one may start with a solution of the halogenated dibenzo(a,h)pyrene-7,14-dione in sulfuric acid of more than 97% strength, and by careful dilution bring down the concentration of the acid to between 97 and 93%. The result is a slurry of the color in the acid, which upon continued stirring yields the orange-colored, coarsely crystalline product above indicated. This method of starting with a solution is particularly adapted to that process wherein the initial material is formed by bromination of dibenzopyrenequinone in oleum.

Without limiting this invention, the following examples are given to illustrate my preferred mode of operation. Parts mentioned are by weight.

EXAMPLE 1

Bromination 146 parts of dibenzo(a,h)pyrene-7,14-dione and 11.6 parts of iodine are dissolved in 730 parts of 25% oleum (±2%) at 25° to 30° C. 70 parts of bromine are added in portions over a period of 1.5 hours. The reaction mixture is stirred 20 hours at room temperature and then drowned in water, filtered and washed acid free. 200 parts of dibromo-dibenzo(a,h)pyrene-7,14-dione are obtained analyzing 31.8% bromine.

Separation 200 parts of the above dibromo-dibenzo(a,h)pyrene-7,14-dione are added to 1900 parts of 96% sulfuric acid (±0.5%) and stirred at room temperature until crystallization is complete. At this point, examination of a thin sample under the microscope shows large, orange-red, thick needles of the orange isomer on a red-violet colored background. The latter represents the acid solution color of the yellow component. The crystalline product is then filtered off and slurried with water or dilute alkali, thereafter filtered, washed and dried. 122 parts of bright, orange-red crystals are obtained. When the acid filtrate is drowned in water and the solid is isolated, 60 parts (dry) of a yellow product are obtained.

*Properties of the Separated Products*

The orange isomer thus obtained exhibits a blue-violet colored solution in concentrated sulfuric acid. It may be acid pasted by dissolving 1 part of the dye in 10 parts of 100% sulfuric acid, followed by drowning the solution in 100 parts of water. The finely divided dye particles are filtered off, washed acid-free, and the aqueous filter cake may be ball milled in the presence of a small amount of dispersing agent (the condensation product of formaldehyde and 2-naphthalenesulfonic acid). The dye paste so obtained dyes cotton in bright, orange-red shades from a red colored aqueous alkaline hydrosulfite vat. The dye exhibits excellent stability in the hot vat, and also dyes well by the cold (80–100° F.) dyeing method. The dyeings show negligible shade change when boiled in soap solutions.

A dye paste may be prepared from the yellow component by drowning the acid filtrate from the separation step into water and proceeding as described above for the orange dye paste. This yellow fraction dyes cotton in red-yellow shades from a red colored aqueous alkaline hydrosulfite vat. The dye is not stable in hot vats and the dyeings change in shade upon soaping. The yellow dye gives a red-violet colored solution in concentrated sulfuric acid.

When this example is repeated except that 5.8 parts of iodine are employed in the bromination step instead of 11.6 parts, essentially the same results are obtained. When only 0.6 part of iodine is used in this example, about 50 parts of the orange isomer and 140 parts of the yellow product are obtained.

EXAMPLE 2

*Ring Closure and Bromination*

20 parts of 1,5-dibenzoylnaphthalene were ring closed in a melt consisting of 58 parts of sodium chloride and 242 parts of aluminum chloride in the presence of 13 parts of m-dinitrobenzene, by heating at 160° to 165° C. for 4 hours as described in Example 1 of U.S. 2,238,-180 (1941). The reaction mixture was then agitated at 160° to 165° C. for 2 additional hours. At this temperature, 16.7 parts of bromine were then added over a period of 22 hours, after which agitation at 160° to 165° C. was continued for 2 hours. The hot melt was drowned in dilute hydrochloric acid from which the halogenated product was filtered and then vat purified to remove non-vattable impurities. The vat purified product was bleached in alkaline hypochlorite, filtered, washed and dried. The purified product analyzed 25.9% bromine and 4.5% chlorine.

*Separation*

The isomeric mixture of purified halogenated material thus obtained was separated into the orange and yellow vat dye fractions by following the separation process of Example 1. The orange and yellow isomers were about half and half, by weight, of the isomeric mixture.

EXAMPLE 3

100 parts dibenzo(a,h)pyrene-7,14-dione and 4 parts of iodine were dissolved in 500 parts of 30% oleum. 45 parts of bromine were added over 2.5 to 3 hours at 25°–35° C. The solution was stirred 16 hours at room temperature, to complete the bromination, and then diluted to 94% sulfuric acid by the addition of 455 parts of 78% sulfuric acid. When crystallization was complete (as shown by the test given in Example 1) the reaction product was filtered off and washed with 100 parts of 90% sulfuric acid. The acid filter cake was slurried in 500 parts of water containing sufficient sodium carbonate to maintain alkaline conditions, filtered, washed neutral and dried. The orange isomer thus obtained in excellent yield contained 32.4% bromine (theory for dibromo derivative, 32.6%). The yellow isomer was obtained by drowning the above concentrated acid filtrate in water, and filtering off the product.

It will be understood that the details of procedure may be varied widely within the skill of those engaged in this art. Thus, while iodine was mentioned above as catalyst, the bromination step may be achieved by the aid of any other catalyst known in the art as useful for this purpose, for instance mercury, selenium, sulfur, antimony or bismuth (U.S.P. 1,988,205).

As shown in the examples, the ratio of orange to yellow products will vary considerably depending on the method of bromination employed. The separation process of this case is operable when applied to the wide variety of isomeric mixtures.

While the slurrying treatment recommended above uses sulfuric acid of 93 to 97% at room temperature, the treatment may nevertheless be achieved with somewhat weaker acids at higher temperatures, for instance 90% sulfuric acid at 50° C. The general aim in choice of acid concentration and temperature is to achieve recrystallization in a reasonable length of time without precipitating any substantial quantities of the yellow component.

The quantity of sulfuric acid employed is preferably selected carefully so as to avoid undue losses of the orange colored component by solution in the acid while at the same time assuring completion of the recrystallization process in a reasonable length of time. Generally speaking, 9 to 15 parts of the acid per part of the initial color will achieve the above aims.

The term "slurry" is used in this specification in a sense to be distinguished from "solution." In other words, "slurry" is meant to cover a mixture of the solid color and acid, the concentration and quantity of acid being insufficient to dissolve the entire color. The conversion of the color into the coarsely crystalline orange-colored form apparently proceeds gradually in such a system, the acid continuously dissolving small portions of the color and continuously precipitating the crystalline component. It is for that reason that stirring of the slurry for a length of time as determined by the microscopic observation test is recommended. Under the conditions above indicated, formation of the orange-colored, coarse crystals will usually be completed in about 10 to 20 hours.

For the purpose of testing shade stability to soaping, a dyeing on cotton may be used, and the soaping test applied may follow standard practice in the textile mill in vat dyeing. The soap concentration is usually 0.5% by weight; the temperature is about 190° F.; and the time of treatment with the soap solution varies from 15 minutes for package dyeing to 15 seconds in continuous dyeing.

I claim as my invention:

1. The process of producing an orange vat dye which comprises forming a slurry of a halogenated dibenzo-(a,h)pyrene-7,14-dione in sulfuric acid of 90 to 97% strength, the quantity of sulfuric acid being from 9 to 15 parts by weight per part by weight of said vat dye, stirring said slurry at a temperature of 20° to 50° C. until it is transformed into a mass consisting of uniform, coarse, orange-colored crystals essentially free of fine, needle-like yellow crystals, separating said orange-colored crystals, slurrying the separated crystals in a liquid medium of the group consisting of water and dilute alkali, and recovering the resulting orange vat dye, said halogenated dibenzo(a,h)pyrene-7,14-dione being essentially a dihalogen compound in which more than one half of the halogen is bromine, while the remainder is a member of the group consisting of chlorine and bromine.

2. A process as in claim 1, wherein the material subjected to slurrying with concentrated sulfuric acid is a solution of dihalogenated dibenzo(a,h)pyrene-7,14-dione in oleum, said solution being first diluted to a sulfuric acid concentration between 93 and 97% to precipitate part of the color, and the diluted mass being then stirred for a period of time sufficient to transform the precipitated color into the coarse, orange-colored crystalline form.

3. The process of producing an orange vat dye, which comprises forming a slurry of dibromo-dibenzo(a,h)pyrene-7,14-dione in sulfuric acid of 95.5 to 96.5% strength, the quantity of sulfuric acid being from 9 to 15 parts by weight per part by weight of said vat dye, agitating said slurry at a temperature of 25° to 30° C., until no more formation of orange-colored crystals is observed, filtering off said orange crystals, further slurrying the same in dilute alkali, and recovering the solid vat dye.

References Cited in the file of this patent

UNITED STATES PATENTS

| | | |
|---|---|---|
| 1,856,710 | Kranzlein et al. | May 3, 1932 |
| 2,454,433 | Cullinan et al. | Nov. 23, 1948 |
| 2,838,525 | Heer | June 10, 1958 |
| 2,921,943 | Fisher et al. | Jan. 19, 1960 |

FOREIGN PATENTS

| | | |
|---|---|---|
| 345,650 | Great Britain | Mar. 23, 1931 |